United States Patent [19]
Oda et al.

[11] Patent Number: 5,114,815
[45] Date of Patent: May 19, 1992

[54] ELECTROPHOTOGRAPHIC PHOTORECEPTOR HAVING A LIGHT-SENSITIVE LAYER FORMED FROM TITANYL PHTHALOCYANINE PIGMENT DISPERSED IN A BRANCHED ESTER OR ALCOHOL SOLVENT

[75] Inventors: Yasuhiro Oda; Hiroshi Yoshioka; Hajime Tadokoro; Yoshihide Fujimaki, all of Hachioji, Japan

[73] Assignee: Konica Corporation, Tokyo, Japan

[21] Appl. No.: 545,546

[22] Filed: Jun. 29, 1990

[30] Foreign Application Priority Data

Jun. 30, 1989 [JP] Japan ................... 1-168595

[51] Int. Cl.$^5$ ............................................. G03G 5/06
[52] U.S. Cl. ........................................ 430/58; 430/78; 430/83; 430/96
[58] Field of Search ............... 430/78, 83; 540/141, 540/58, 96

[56] References Cited

U.S. PATENT DOCUMENTS 4,755,443  7/1988  Suzuki et al.
4,994,566  2/1991  Mimura et al. .................. 430/78

*Primary Examiner*—John Goodrow
*Attorney, Agent, or Firm*—Finnegan, Henderson, Farabow, Garrett and Dunner

[57] ABSTRACT

An electrophotographic photoreceptor having a light-sensitive layer on an electroconductive base is disclosed, the improvement wherein the light-sensitive layer is formed from a dispersion in which a titanyl phthalocyanine pigment having at least two predominant peaks of the Bragg angle $2\theta$ at $9.6°\pm0.2°$ and $27.2°\pm0.2°$ in a diffraction spectrum obtained with characteristic x-rays of Cu K$\alpha$ at a wavelength of 1.54 Å is dispersed in a dispersion medium that contains at least one of branched ester and alcohol solvents as a chief component.

13 Claims, 6 Drawing Sheets

ELECTROPHOTOGRAPHIC PHOTORECEPTOR HAVING A LIGHT-SENSITIVE LAYER FORMED FROM TITANYL PHTHALOCYANINE PIGMENT DISPERSED IN A BRANCHED ESTER OR ALCOHOL SOLVENT

BACKGROUND OF THE INVENTION

This invention relates to an electrophotographic photoreceptor, particularly to one that uses a specified titanyl phthalocyanine pigment as a photoconductive material, that is effectively used with printers, copiers, etc. and that is suitable for image formation with light from semiconductor lasers, LEDs, etc. being used as exposure means. The present invention also relates to a process for producing such photoreceptors.

The use of inorganic photoconductive materials in electrophotographic photoreceptors is increasingly supplanted by organic photoconductive materials. This is because many and various organic photoconductive materials can be synthesized by changing the combinations of starting compounds and process conditions, and this great latitude in the selection of materials permits a desired photoreceptor to be easily fabricated according to a specific object.

The latitude in the selection of materials can be further increased in an electrophotographic photoreceptor of a "functionally separated" type in which carrier generating and transporting capabilities are individually fulfilled by different organic photoconductive materials, and this is expected to provide substantial improvements in electrophotographic characteristics such as chargeability, sensitivity and durability.

There is a growing need of the copying industry for improving image quality and providing copies with an image editing capability. Under these circumstances, efforts are being made to develop a digital copier, printer or other recording apparatuses that meet this need. It is, therefore, strongly desired to improve the performance of photoreceptors used as recording media. In digital recording apparatuses, a photoreceptor is exposed to dots of laser light modulated with an image signal and the resulting latent image dots are developed by a reversal development method. As a laser light source, a semiconductor laser is preferably used since it permits the exposure apparatus to be simplified in design and reduced in size and cost. A semiconductor laser has an oscillation wavelength in the infrared region beyond 750 nm. It is therefore required that the photoreceptor used should have high sensitivity to light in the wavelength range of at least 750-850 nm.

Various organic dyes and pigments have been proposed for use as carrier generation materials in a "functionally separated" photoreceptor and those which are already used commercially include polycyclic quinone pigments typified by dibromoanthanthrone, pyrylium dyes, eutectic complexes of pyrylium dyes and polycarbonates, squaryliun pigments, phthalocyanine pigments, azo pigments, etc. Unexamined Published Japanese Patent Application Nos. 239248/1986, 217050/1986, 67094/1987, 218768/1988, etc. describe titanyl phthalocyanine pigments having predominant sensitivity to light at wavelengths longer than 750 nm. The titanyl phthalocyanine pigments described in these prior patents are designed to have a specific aggregated or crystalline structure so that their predominant absorption is extended into the longer wavelength range to provide a higher sensitivity. However, it is difficult to set optimum conditions for producing the pigments described above and no carrier generation materials have been discovered that are satisfactory in all aspects including chargeability, sensitivity and resistance to cyclic use. In addition, a further improvement in sensitivity is desired.

With a view to meeting this need for higher sensitivity, the assignee previously proposed a photoreceptor using a high-sensitivity titanyl phthalocyanine compound (see Unexamined Published Japanese Patent Application No. 17066/1989 and Japanese Patent Application No. 286537/1988 filed Nov. 11, 1988). This photoreceptor is characterized in that a titanyl phthalocyanine pigment having at least two predominant peaks of the Bragg angle $2\theta$ at $27.2°\pm0.2°$ and $9.6°\pm0.2°$ in a diffraction spectrum obtained with characteristic X-rays of Cu K$\alpha$ at a wavelength of 1.54 Å is used as a carrier generation material. The X-ray diffraction spectrum of this titanyl phthalocyanine pigment is entirely different from those of known titanyl phthalocyanine pigments. It has such an aggregated structure that visible and near-infrared absorption spectra show a maximum absorption in the range of 780-860 nm, and hence it exhibits extremely high sensitivity to light from a semiconductor laser.

The titanyl phthalocyanine pigment previously proposed by the assignee has excellent sensitivity characteristics as described above. Further, a photoreceptor using that pigment is suitable for image formation by a digital method, in which said photoreceptor is exposed to dots of laser light modulated with an image signal and the resulting latent image dots are developed by reversal development to produce a toner image in dots. However, the sensitivity characteristics and charge retention of the photoreceptor using said titanyl phthalocyanine pigment are sometimes dependent on the method of dispersing the pigment particles and it is desirable to establish a suitable method of dispersion that is capable of producing a photoreceptor having consistent characteristics.

In ordinary electrophotographic photoreceptors, the electrical contact between a grounded conductive layer and a light-sensitive layer is not microscopically uniform and the efficiency of carrier injection from the conductive layer may differ from one site to another, creating local differences in the distribution of electric charges held on the photoreceptor's surface. These differences will become visible as image defects after development, which are white spots in the black background in a positive-working development process or black spots in the white background in a negative-working reversal development process. In particular, black spots appearing in a reversal development process are as deleterious to image quality as background fogging. This problem is particularly noticeable in photoreceptors provided with high sensitivity by use of the improved titanyl phthalocyanine pigment and the occurrence of black spots is extensive if a reversal development process is adopted.

SUMMARY OF THE INVENTION

An object, therefore, of the present invention is to solve the aforementioned problems of the prior art by providing an electrophotographic photoreceptor that has particularly high sensitivity to light of longer wavelengths such as one emitted from a semiconductor laser, that has good charge retention, and that is satisfactorily protected against image defects, in particular, the occurrence of black stops during reversal development.

Another object of the present invention is to provide a process for producing said photoreceptor.

The electrophotographic photoreceptor of the present invention has a light-sensitive layer on an electroconductive base or support and this light-sensitive layer is formed from a dispersion in which a titanyl phthalocyanine pigment having at least two predominant peaks of the Bragg angle $2\theta$ at $9.6°\pm0.2°$ and $27.2°\pm0.2°$ in a diffraction spectrum obtained with characteristic X-rays of Cu $K\alpha$ at a wavelength of 1.54 Å is dispersed in a dispersion medium that contains at least one of branched ester and alcohol solvents as a chief component.

DETAILED DESCRIPTION OF THE INVENTION

The titanyl phthalocyanine pigment specified hereinabove has a different state of crystal aggregation than the titanyl phthalocyanine pigments described in the aforementioned prior patents. It has characteristic X-ray diffraction spectra as shown in FIGS. 3-6 for the samples prepared in Synthesis Examples 1-4 to be described below. The crystal aggregation of this pigment is such that its visible and near-infrared absorption spectra show a maximum absorption in the range of 780-860 nm and hence it exhibits an extremely high sensitivity to light of longer wavelengths such as one emitted from a semiconductor laser.

The titanyl phthalocyanine pigment of the present invention has a basic structure represented by the following general formula:

(where $X^1$, $X^2$, $X^3$ and $X^4$ are each independently a halogen atom, an alkyl group or an alkoxy group; and n, m, l and k are each an integer of 0–4).

The X-ray diffraction spectrum of this titanyl phthalocyanine having the characteristics described above was measured under the following conditions (which will apply to all the description that follows):

| | |
|---|---|
| X-ray tube | Cu |
| Voltage | 40.0 kV |
| Current | 100 mA |
| Start angle | 6.00 deg. |
| Stop angle | 35.00 deg. |
| Step angle | 0.020 deg. |
| Time of measurement | 0.50 sec. |

Said X-ray diffraction spectrum is one of reflection type which is obtained by performing a measurement with Model 320 Automatic Spectrophotometer (Hitachi Ltd.).

The titanyl phthalocyanine pigment of the present invention has predominant peaks of the Bragg angle $2\theta$ at $9.6°\pm0.2°$ and $27.2°\pm0.2°$. Besides these characteristic peaks, the pigment also has peaks at $11.7°\pm0.2°$, $15.0°\pm0.2°$, $23.5°\pm0.2°$ and $24.1°\pm0.2°$.

Among the titanyl phthalocyanine pigments within the scope of the present invention, those in which the intensity of the peak at $9.6°\pm0.2°$ of the Bragg angle $2\theta$ is no less than 40% of the intensity of the peak at $27.2°\pm0.2°$ are particularly preferred from the viewpoints of such factors as sensitivity and chargeability.

The titanyl phthalocyanine pigment of the present invention may be prepared by the following method: 1,3-diiminoisoindoline is mixed with sulfolane and titanium tetrapropoxide is added to the mixture, with reaction being carried out in a nitrogen atmosphere at a temperature of 80°-300° C., preferably at 100°-260° C.; the reaction mixture is then left to cool and the resulting precipitate is recovered by filtration to yield titanyl phthalocyanine. By subsequent treatment with a suitable solvent, titanyl phthalocyanine of the desired crystal form shown in FIGS. 3-6 can be obtained. The solvent treatment may be carried out with common stirrers, as well as homomixers, dispersers, agitators, ball mills, sand mills, attritors, etc.

The titanyl phthalocyanine specified above may be used in combination with other carrier generation materials to the extent that will not impair the objects of the present invention. Examples of such usable carrier generation materials are those titanyl phthalocyanine compounds which have different crystal forms than the titanyl phthalocyanine of the present invention, such as α-titanyl phthalocyanine, β-titanyl phthalocyanine, titanyl phthalocyanine of mixed α- and β-forms, and amorphous titanyl phthalocyanine. Phthalocyanine pigments other than those listed above, azo pigments, anthraquinone pigments, perylene pigments, polycyclic quinone pigments and squarylium pigments may also be used.

Figure 1:
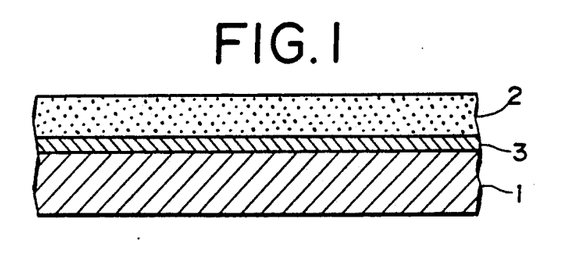
FIG. 1 is a cross-sectional view showing a layer arrangement of the photoreceptor of the present invention.

In order to fabricate the photoreceptor of the present invention, the titanyl phthalocyanine pigment specified above is mixed and dispersed in a solution having a binder resin dissolved in a suitable solvent, and a carrier transport material to be described below is dissolved in the dispersion to prepare a coating solution, which is then applied to an optionally subbed conductive base or support by a suitable method such as dip coating, spray coating or spiral coating to fabricate a photoreceptor of the single-layered structure shown in FIG. 1, in which the conductive base, the single light-sensitive layer and the subbing layer are indicated by 1, 2 and 3, respectively.

Figure 2:
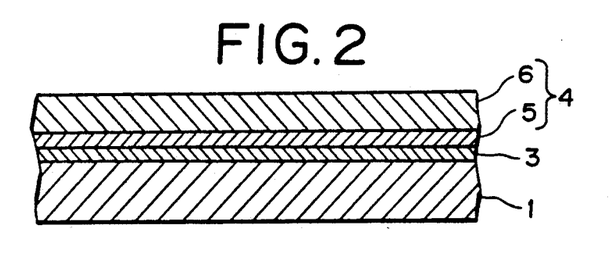
FIG. 2 is a cross-sectional view showing another layer arrangement of the photoreceptor of the present invention.

If a photoreceptor having high sensitivity and durability is to be fabricated, the functionally separated dual-layer structure shown in FIG. 2 is preferred. A photoreceptor of this type may be fabricated by the following method: first, a coating solution is prepared by mixing and dispersing the titanyl phthalocyanine pigment of the present invention in a solution having a binder resin dissolved in a suitable dispersion medium; the solution is then applied onto an optionally subbed support 1 to form a carrier generation layer 5; thereafter, a coating solution containing a carrier transport material is applied onto the carrier generation layer to form a carrier transport layer 6 in superposition on the carrier generation layer, whereby a light-sensitive layer of a dual structure 4 is formed. The following description is mainly directed to this photoreceptor of a dual structure.

In order to form the carrier generation layer 5 of the dual light-sensitive layer 4, a binder resin is mixed and dissolved in a dispersion medium and the resulting solution is mixed with the titanyl phthalocyanine pigment of the present invention. The mixture is then treated with a homomixer, a ball mill, an ultrasonic disperser or some other suitable means to prepare a coating solution having the pigment particles finely dispersed in the medium. The so prepared coating solution is applied onto the subbing layer 3 formed on the surface of the conductive base 1.

The present inventors found that when forming the carrier generation layer of the dual light-sensitive layer, a dispersion medium containing at least one of branched ester and alcohol solvents as a chief component was advantageous for insuring that the crystallinity and aggregation of the titanyl phthalocyanine pigment particles would remain stable not only in the dispersion but also after it was applied to form a layer.

Examples of the branched ester solvent that can be used in the present invention include isopropyl acetate, tertiary butyl acetate, isobutyl acetate and secondary butyl acetate. Examples of the branched alcohol solvent that can be used in the present invention include isopropyl alcohol, isobutyl alcohol, secondary butyl alcohol and tertiary butyl alcohol. These solvents can be used either on their own or as admixtures.

The dispersion having the titanyl phthalocyanine pigment of the present invention dispersed in one or more of the dispersion solvents described above preferably contains a binder resin. There is no particular limitation on the binder resin that can be used but preferred examples are silicone resins and polyvinyl butyral.

The binder resins described above may be used either on their own or as admixtures. The carrier generation material is preferably used in an amount of 10-600 wt%, more preferably 50-400 wt%, of the binder resin.

The carrier generation layer 5 thus formed preferably has a thickness of 0.01-20 μm with the range of 0.05-5 μm being more preferred.

When the carrier generation material is to be dispersed in the carrier generation layer 5, it is preferably reduced to particles having an average size of 2 μm or below, preferably 1 μm or below. If the particles of the carrier generation material are too large, they will not be dispersed efficiently in the carrier generation layer. Further, some of the particles will protrude from the surface of the carrier generation layer to impair its smoothness, with occasional occurrence of discharge at the protruding particles or toner filming due to the deposition of toner particles on the protrusions.

The carrier transport layer 6 is subsequently provided on the carrier generation layer 5 to form the light-sensitive layer 4. The solvent for preparing a coating solution from which the carrier transport layer 6 is to be formed may be of any type that dissolves the binder resin and carrier transport material to be described below but that will neither dissolve nor attack the underlying carrier generation layer 5.

While various carrier transport materials may be used, typical examples include compounds having nitrogenous heterocyclic nuclei and condensed ring nuclei thereof typified by oxazole, oxadiazole, thiazole, thiadiazole and imidazole, polyarylalkane compounds, pyrazoline compounds, hydrazone compounds, triarylamine compounds, styryl compounds, styryltriphenylamine compounds, β-phenylstyryltriphenylamine compounds, butadiene compounds, hexatriene compounds, carbazole compounds, and condensed polycyclic compounds.

Specific examples of these carrier transport materials may be found in Unexamined Published Japanese Patent Application No. 107356/1986 and the structures of most representative examples are shown below:

T-1

T-2

-continued

T-3

T-4

T-5

T-6

T-7

T-8

T-9

-continued

T-10

T-11

T-12

T-13

T-14

T-15

T-16

T-17

T-18

T-19

Any binder resin can be used together with the carrier transport material to form the carrier transport layer but it should be hydrophobic and have a film-forming capability, as illustrated by the following examples: polycarbonates; polycarbonate Z resin; acrylic resins; methacyrlic resins; polyvinyl chloride; polyvinylidene chloride; polystyrene; styrene-butadiene copolymers; polyvinyl acetate; polyvinyl carbazole; styrene-alkyd resins; silicone resins; silicone-alkyd resins; polyesters; phenolic resins; polyurethane; epoxy resins; vinylidene chloride-acrylonitrile copolymer; vinyl chloride-vinyl acetate copolymer; and vinyl chloride-vinyl acetate-maleic anhydride copolymer.

A wide variety of solvents and dispersion media may be used in forming the carrier transport layer and they include: n-butylamine, ethylenediamine, N,N-dimethylformamide, acetone, methyl ethyl ketone, cyclohexanone, tetrahydrofuran, dioxane, ethyl acetate, butyl acetate, methyl cellosolve, ethyl cellosolve, ethylene glycol dimethyl ether, toluene, xylene, acetophenone, chloroform, dichloromethane, dichloroethane, trichloroethane, methanol, ethanol, propanol, butanol, etc.

The carrier transport material is preferably used in an amount of 10-500 wt% of the binder resin. The carrier transport layer preferably has a thickness of 1-100 μm, with the range of 5-30 μm being more preferred.

In order to improve sensitivity or reduce residual potential or fatigue due to cyclic use, the light-sensitive layer of the photoreceptor of the present invention may contain one or more electron-accepting materials. Useful electron-accepting materials are selected from among the following compounds having high electron affinity: succinic anhydride, maleic anhydride, dibromosuccinic anhydride, phthalic anhydride, tetrachlorophthalic anhydride, tetrabromophthalic anhydride, 3-nitrophthalic anhydride, 4-nitrophthalic anhydride, pyromellitic anhydride, mellitic anhydride, tetracyanoethylene, tetracyanoquinodimethane, o-dinitrobenzene, m-dinitrobenzene, 1,3,5-trinitrobenzene, p-nitrobenzonitrile, picryl chloride, quinone chlorimide, chloranil, bromanil, dichlorodicyano-p-benzoquinone, anthraquinone, dinitroanthraquinone, 9-fluorenylidene (malonodinitrile), polynitro-9-fluorenylidene (malonodinitrile), picric acid, o-nitrobenzoic acid, p-nitrobenzoic acid, 3,5-dinitrobanzoic acid, pentafluorobenzoic acid, 5-nitrosalicylic acid, 3,5-dinitrosalicylic acid, phthalic acid, and mellitic acid.

These electron-accepting materials are desirably used in such amounts that the weight ratio of carrier generation material to electron-accepting material is in the range of from 100:0.01 to 100:200, more preferably from 100:0.1 to 100:100.

The light-sensitive layer may contain an antioxidant, a light stabilizer or some other anti-deterioration agents in order to improve its keeping quality, endurance and resistance to environmental factors.

The base or support on which the light-sensitive layer is to be formed may be a metal plate, a metal drum or a thin conductive layer that is made of a conductive polymer, a conductive compound such as indium oxide or a metal such as aluminum, palladium or gold and which is coated, vapordeposited, laminated or otherwise formed on a substrate such as paper or a plastic film.

As will be understood from the examples that follow, the photoreceptor of the present invention which has the construction described above has the advantage that it has high-sensitivity characteristics to be suitable for use as a photoreceptor in image forming with laser light being used as an exposure means and that it is satisfactorily protected against the occurrence of black spots and other image defects during reversal development.

The following examples are provided for the purpose of further illustrating the present invention but are in no way to be taken as limiting.

Synthesis of various titanyl phthalocyanine pigments is first described.

Synthesis Example 1

1,3-Diiminoisoindoline (29.2 g) is mixed with sulfolane (200 ml). After adding 17.0 g of titanium tetraisopropoxide, the mixture is subjected to reaction in a nitrogen atmosphere at 140° C. for 2 h. After the reaction mixture is left to cool, the resulting precipitate is recovered by filtration, washed successively with chloroform, 2% aqueous HCl, water and methanol in the order written, and dried to obtain titanyl phthalocyanine in an amount of 25.5 g (88.5%).

The product is dissolved in 20 volumes of conc. sulfuric acid and poured into 100 volumes of water. The resulting precipitate is recovered by filtration. The recovered wet cake is heated in 1,2-dichloroethane at 50° C. for 10 h to produce a crystal form having the X-ray diffraction spectrum shown in FIG. 3. The crystal had two peaks of the Bragg angle $2\theta$ at 9.6° and 27.2°, and intensity of the peak at 9.6° was 102% of the peak intensity at 27.2°.

Synthesis Example 2

1,3-Diiminoisoindoline (29.2 g) is mixed with sulfolane (200 ml). After adding titanium tetraisopropoxide (17.0 g), the mixture is subjected to reaction in a nitrogen atmosphere at 140° C. for 2 h. After the reaction is left to cool, the resulting precipitate is recovered by filtration, washed successively with chloroform, 2% HCl, water and methanol in the order written, and dried to obtain titanyl phthalocyanine in an amount of 25.5 g (88.5%).

The product is dissolved in 20 volumes of conc. sulfuric acid and poured into 100 volumes of water. The resulting precipitate is recovered by filtration. The recovered wet cake is heated in 1,2-dichloroethane at room temperature for 1 h to produce a crystal form having the X-ray diffraction spectrum shown in FIG. 4. The crystal had two peaks of the Bragg angle $2\theta$ at 9.6° and 27.2°, and the intensity of the peak at 9.6° was 75% of the peak intensity at 27.2°.

Synthesis Example 3

Titanium tetrachloride (6.5 ml) is added dropwise to a mixture of phthalodinitrile (25.6 g) and α-chloronaphthalene (150 ml) in a nitrogen stream and the mixture is subjected to reaction at 200°-220° C. for 5 h. The resulting precipitate is recovered by filtration and washed successively with α-chloronaphthalene, chloroform and methanol in the order written. Thereafter, the precipitate is refluxed in aqueous ammonia to complete its hydrolysis, followed by successive washing with water and methanol and drying to obtain titanyl phthalocyanine in an amount of 21.8 g (75.6%).

The product is dissolved in 10 volumes of conc. sulfuric acid and poured into 100 volumes of water. The resulting precipitate is recovered by filtration. The recovered wet cake is stirred in 1,2-dichloroethane at room temperature for 1 h to produce a crystal form having the X-ray diffraction spectrum shown in FIG. 5. The crystal had two peaks of the Bragg angle $2\theta$ at 9.6° and 27.2°, and the intensity of the peak at 9.6° was 45% of the peak intensity at 27.2°.

Synthesis Example 4

Titanium tetrachloride (6.5 ml) is added dropwise to a mixture of phthalodinitrile (25.6 g) and α-chloronaphthalene (150 ml) in a nitrogen stream, and the mixture is subjected to reaction at 200°-220° C. for 5 h. The resulting precipitate is recovered by filtration and successively washed with α-chloronaphthalene, chloroform and methanol in the order written. Subsequently, the washed precipitate is refluxed in aqueous ammonia to complete its hydrolysis, followed by successive washing with water and methanol and drying to obtain titanyl phthalocyanine in an amount of 21.8 g (75.6%).

The product is dissolved in 10 volumes of conc. sulfuric acid and poured into 100 volumes of water. The resulting precipitate is recovered by filtration. The recovered wet cake is stirred in o-dichlorobenzene at room temperature for 1 h to produce a crystal form having the X-ray diffraction spectrum shown in FIG. 6. The crystal had two peaks of the Bragg angle $2\theta$ at 9.6° and 27.2°, and the intensity of the peak at 9.6° was 35% of the peak intensity at 27.2°.

Comparative Synthesis Example 1

Figure 7:
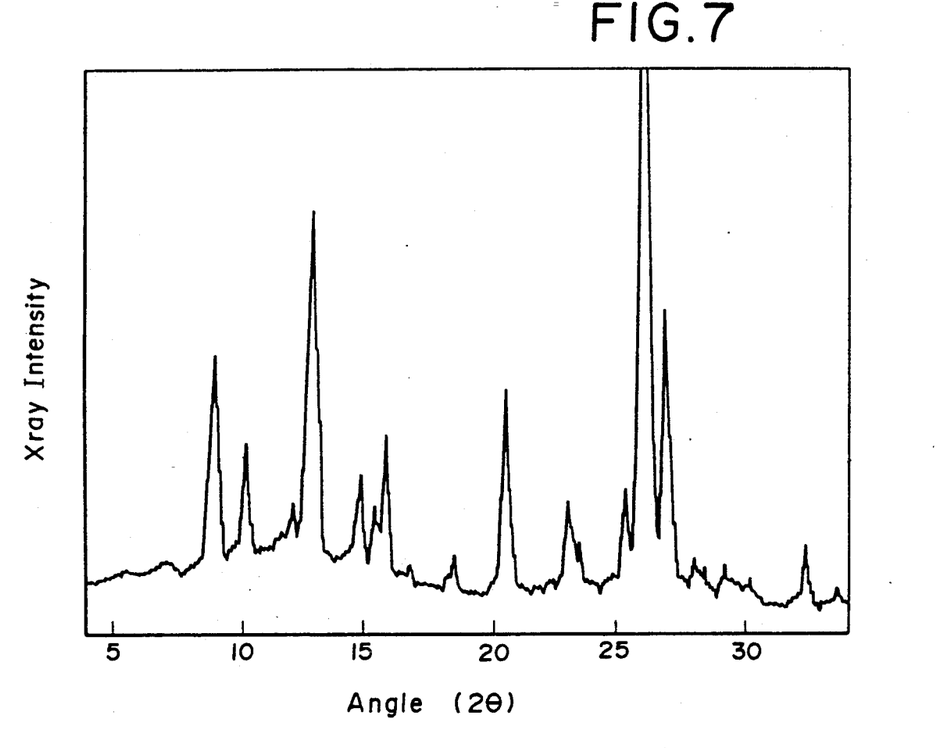
FIG. 7 is an X-ray diffraction scan of the titanyl phthalocyanine pigment prepared in Comparative Synthesis Example 1.

The wet cake formed in Synthesis Example 1 was dried with stirring in α-chloronaphthalene to obtain β-titanyl phthalocyanine having the X-ray diffraction spectrum shown in FIG. 7.

EXAMPLE 1

Three parts by weight (all "parts" that appear hereinafter are on a weight basis) of a copolymer polyamide ("Amilan CM-8000" of Toray Industries, Inc.) was dissolved in 100 parts of methanol under heating and the solution was filtered through a 0.6-μm filter. The filtered solution was dip-coated onto an aluminum drum to form a subbing layer in a thickness of 0.5 μm.

Figure 3:
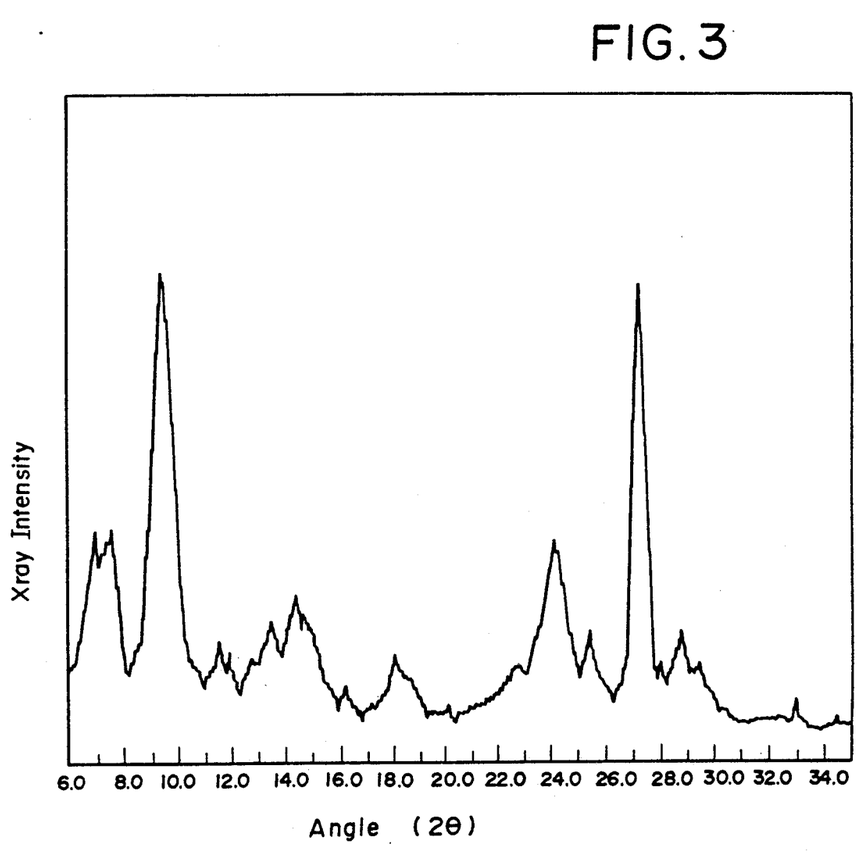
FIGS. 3-6 are X-ray diffraction scans of the titanyl phthalocyanine pigments prepared in Synthesis Examples 1-4 of the present invention.
Figure 4:
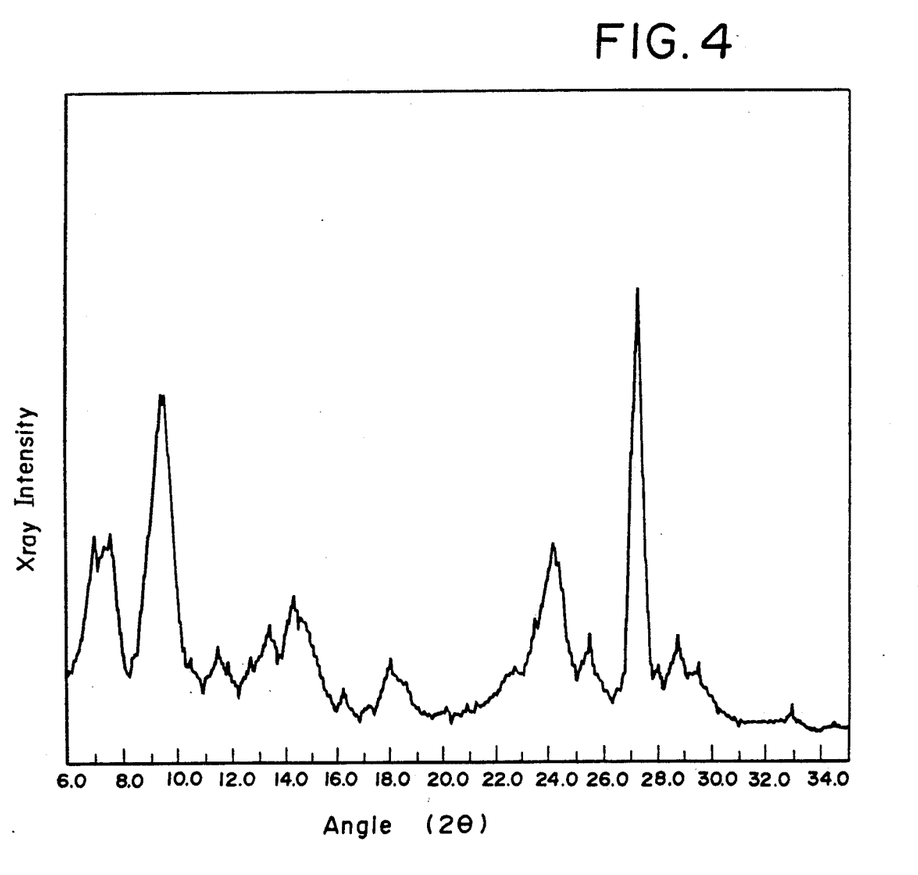
Figure 5:
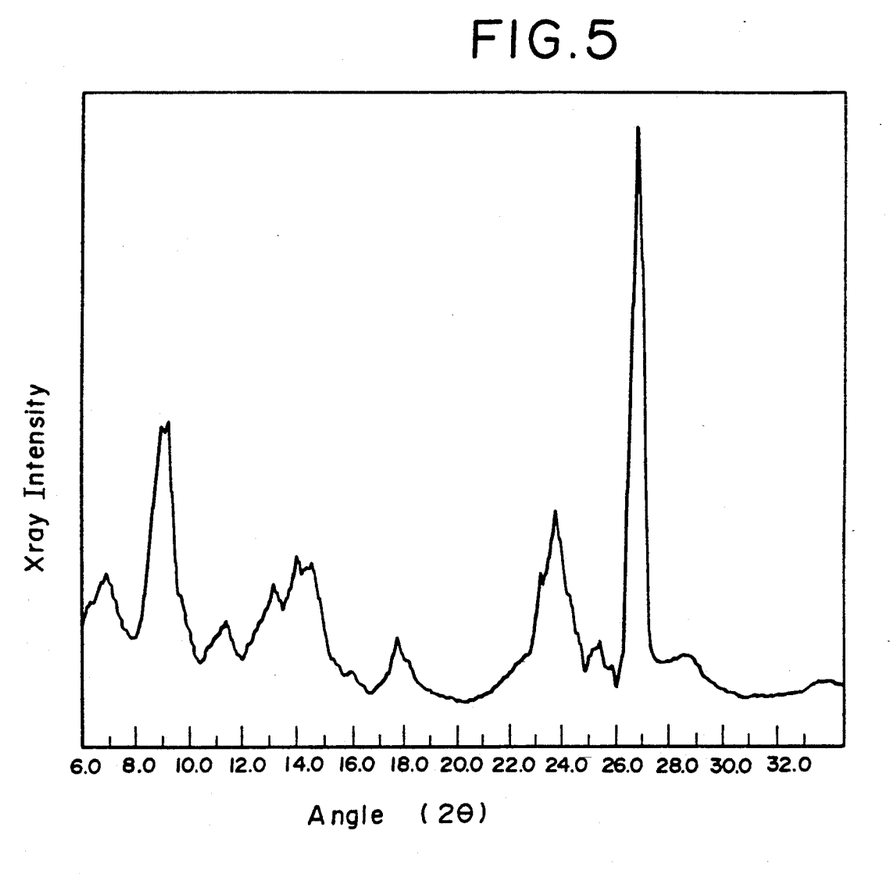
Figure 6:
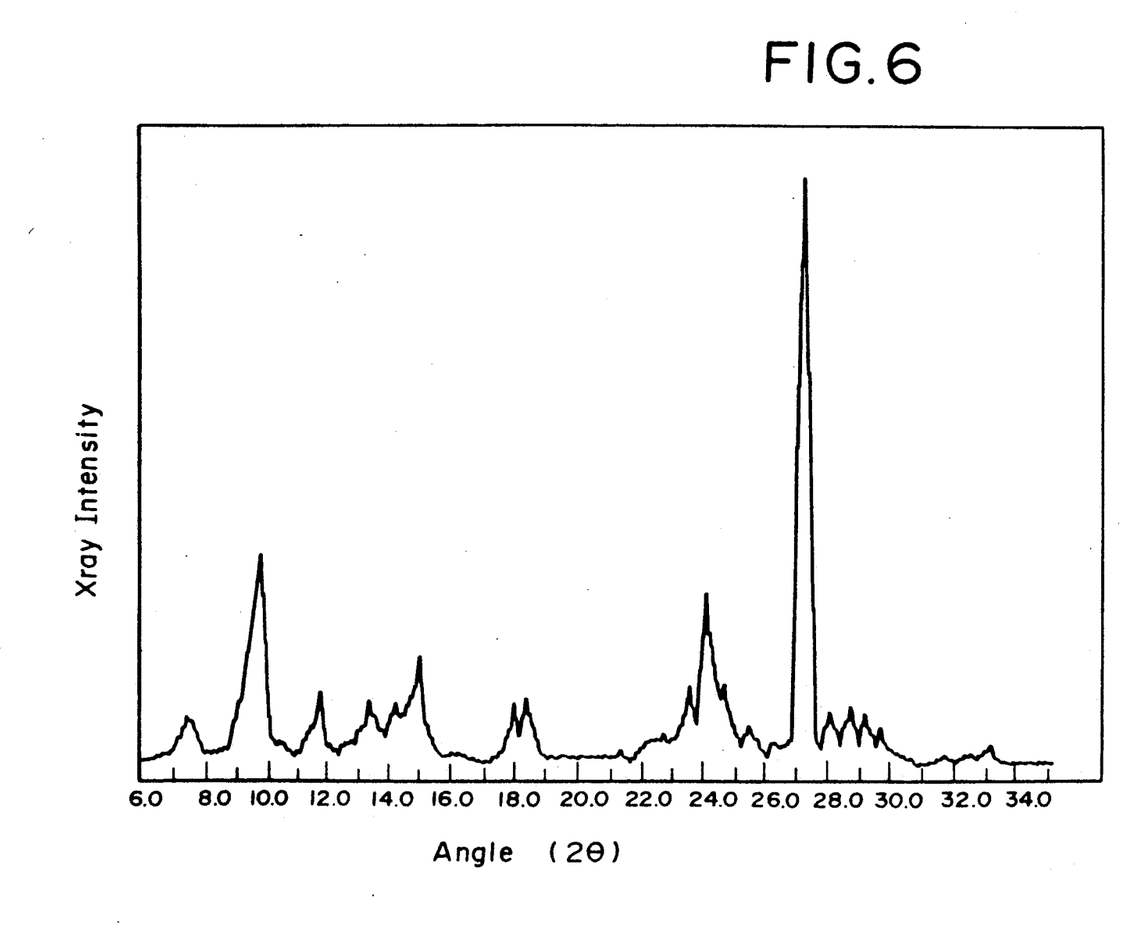

Three parts of the titanyl phthalocyanine prepared in Synthesis Example 1 and that had the X-ray diffraction pattern shown in FIG. 3 and 3 parts on a solids basis of a binder resin (a 15% solution of silicone resin "KR-5240" in xylene/butanol; product of Shin-Etsu Chemical Co., Ltd.) were dispersed in 100 parts of isopropyl acetate (dispersion medium) by means of a sand mill. The resulting dispersion was dip-coated onto the subbing layer to form a carrier generation layer in a thickness of 0.2 μm.

Subsequently, 1 part of a carrier transport material T-1, 1.5 parts of a polycarbonate resin ("Jupilon Z 200" of Mitsubishi Gas Chemical Co., Inc.) and a small amount of silicone oil ("KF-54" of Shin-Etsu Chemical Co., Ltd.) were dissolved in 10 parts of 1,2-dichloroethane. The resulting solution was dip-coated onto the carrier generation layer and dried to form a carrier transport layer in a thickness sample No. 1.

EXAMPLES 2-9

Eight additional photoreceptors (sample Nos. 2-9) were fabricated as in Example 1 except that the carrier generation material, the dispersion solvent for the carrier generation layer and the binder resin therefor were changed to those shown in Table 1.

Comparative Examples 1-4

Four comparative photoreceptors (comparative sample Nos. 1-4) were fabricated as in Example 1 except that the carrier generation material, the dispersion solvent for the carrier generation layer and the binder resin therefor were changed to those shown in Table 1.

TABLE 1

| No. | Carrier generation material Type | Carrier generation material 9.6°/27.2°* | Dispersion solvent | Binder resin |
|---|---|---|---|---|
| Example | | | | |
| 2 | Pigment of Synthesis 2 | 75 | IPAc | KR-5240 |
| 3 | Pigment of Synthesis 2 | 75 | TBAc | KR-5240 |
| 4 | Pigment of Synthesis 2 | 75 | IBAc | KR-5240 |
| 5 | Pigment of Synthesis 2 | 75 | sec-BAc | KR-5240 |
| 6 | Pigment of Synthesis 2 | 75 | TBAc | ES-lec BMS |
| 7 | Pigment of Synthesis 3 | 45 | TBAc | KR-5240 |
| 8 | Pigment of Synthesis 4 | 35 | TBAc | KR-5240 |
| 9 | Pigment of Synthesis 2 | 75 | Isopropyl alcohol | ES-lec BMS |
| Comparative Example | | | | |
| 1 | Pigment of Synthesis 2 | 75 | Tetrahydrofuran | KR-5240 |
| 2 | Pigment of Synthesis 2 | 75 | 1,2-dichloroethane | KR-5240 |
| 3 | Pigment of Synthesis 2 | 75 | Tetrahydrofuran | ES-lec BMS |
| 4 | Pigment of Comparative Synthesis 1 | — | TBAc | KR-5240 |

*The ratio (%) of peak intensity at Bragg angle (2θ) of 9.6° to peak intensity at 27.2°.

The following dispersion solvents and binder resins were used:
Dispersion solvent

| | |
|---|---|
| IPAc: | isopropyl acetate |
| TBAc: | tertiary butyl acetate |
| IBAc: | isobutyl acetate |
| sec-BAc: | secondary butyl acetate |

Binder resin
Silicone resin ("KR-5240" of Shin-Etsu Chemical Co., Ltd.
Polyvinyl butyral ("Es-lec BMS" of Sekisui Chemical Co., Ltd.)

Sample Nos. 1-9 and Comparative Sample Nos. 1-4 were set in an electrophotographic copier adapted from "U-Bix 1550" (product of Konica Corp.) to be equipped with a semiconductor laser as a light source. The grid voltage, $V_G$, was adjusted so that the potential in the unexposed area, $V_H$, would be −600 volts, and thereafter, the potential, $V_L$, in the exposed area under illumination at 0.7 mW was measured. Following the exposure, reversal development was performed at a bias voltage of −560 volts and the degree of black spots in the white background around the copied image was evaluated.

In evaluating the formation of black spots, the diameter of black spots and their number were measured with an image analyzer Omnicon Model 3000 of Shimadzu Corp. and the number of black spots larger than 0.05 mm in diameter that appeared per square centimeter was counted. The criteria for evaluation were as follows.

| No. of black spots greater than 0.05 mmØ | Rating |
|---|---|
| ≦1/cm² | O |
| ≧2/cm² | X |

Photoreceptor samples were fabricated using the dispersions for carrier generation layer that had been left to stand in the dark at 20° C. for a month. These samples were subjected to the same evaluation as described above, and the results are shown in Table 2 below.

TABLE 2

| No. | $V_L$ (V) Initial | $V_L$ (V) 1 mo. | $V_G$ (V) Initial | $V_G$ (V) 1 mo. | Black spots Initial | Black spots 1 mo. |
|---|---|---|---|---|---|---|
| Example | | | | | | |
| 1 | −32 | −33 | −550 | −550 | O | O |
| 2 | −31 | −31 | −540 | −535 | O | O |
| 3 | −32 | −33 | −545 | −540 | O | O |
| 4 | −33 | −32 | −535 | −540 | O | O |
| 5 | −32 | −33 | −540 | −545 | O | O |
| 6 | −33 | −34 | −545 | −545 | O | O |
| 7 | −45 | −47 | −560 | −565 | O | O |
| 8 | −45 | −50 | −570 | −575 | O | O |
| 9 | −32 | −33 | −540 | −545 | O | O |
| Comparative Example | | | | | | |
| 1 | −70 | −95 | −750 | −820 | O | X |
| 2 | −75 | −105 | −770 | −830 | O | X |
| 3 | −60 | −105 | −770 | −900 | X | X |
| 4 | −110 | −145 | −650 | −750 | X | X |

As Table 2 shows, the photoreceptor fabricated in accordance with the present invention had higher sensitivity and better charge retention than the comparative samples and they were satisfactorily protected against the formation of image defects, in particular, black spots during reversal development. Further, the characteristics of the photoreceptors of the present invention did not change even after the lapse of one month on account of their good dispersion stability.

As described on the foregoing pages, the photoreceptor of the present invention is sufficiently protected against the occurrence of image defects such as black spots during reversal development to insure the formation of high-sensitivity and high-quality images in a consistent way.

What is claimed is:

1. In an electrophotographic photoreceptor comprising a light-sensitive layer on an electroconductive base, wherein said light-sensitive layer is formed from a dispersion comprising a titanyl phthalocyanine pigment having at least two predominant peaks of the Bragg angle 2θ at 9.6°±0.2° and 27.2°±0.2° in a diffraction spectrum obtained with characteristic X-rays of Cu Kα at a wavelength of 1.54 Å dispersed in a dispersion medium that contains a dispersion solvent selected from branched esters, branched alcohols and mixtures thereof as a chief component.

2. An electrophotographic photoreceptor according to claim 1 wherein the peak of the Bragg angle 2θ at 9.6°±0.2° has an intensity which is at least 40% of the intensity of the peak at 27.2°±0.2°.

3. An electrophotographic photoreceptor according to claim 1 wherein said dispersion contains a binder.

4. An electrophotographic photoreceptor according to claim 3 wherein said binder is a silicone resin or polyvinyl butyral.

5. An electrophotographic photoreceptor according to claim 1 wherein said light-sensitive layer consists of a carrier generation layer overlaid with a carrier transport layer, said carrier generation layer being formed from said dispersion.

6. A process for producing an electrophotographic photoreceptor by forming a light-sensitive layer on an electroconductive base, said light-sensitive layer being formed by dispersing a titanyl phthalocyanine pigment having at least two predominant peaks of the Bragg angle $2\theta$ at $9.6°\pm0.2°$ and $27.2°\pm0.2°$ in a diffraction spectrum obtained with characteristic X-rays of Cu K$\alpha$ at a wavelength of 1.54 Å in a dispersion medium that contains a dispersion solvent selected from branched esters, branched alcohols and mixtures thereof as a chief component.

7. An electrophotographic according to claim 1, wherein said dispersion solvent is selected from the group consisting of isopropyl acetate, isobutyl acetate, sec-butyl acetate, tert-butyl acetate, isopropyl alcohol, isobutyl alcohol, sec-butyl alcohol, tert-butyl alcohol and mixtures thereof.

8. An electrophotographic photoreceptor according to claim 7, wherein said dispersion medium further contains a binder resin.

9. An electrophotographic photoreceptor according to claim 8, wherein said binder resin is selected from the group consisting of silicone resins and polyvinyl butyral.

10. A process according to claim 6, wherein said dispersion solvent is selected from the group consisting of isopropyl acetate, isobutyl acetate, sec-butyl acetate, tert-butyl acetate, isopropyl alcohol, isobutyl alcohol, sec-butyl alcohol, tert-butyl alcohol and mixtures thereof.

11. A process according to claim 10, wherein said dispersion medium further contains a binder resin.

12. A process according to claim 11, wherein said binder resin is selected from the group consisting of silicone resins and polyvinyl butyral.

13. A process according to claim 12, wherein the dispersing step comprises dispersing 3 parts by weight of said titanyl phthalocyanine pigment in 100 parts by weight of said dispersion solvent and 3 parts by weight on a solids basis of said binder resin.

* * * * *

UNITED STATES PATENT AND TRADEMARK OFFICE
CERTIFICATE OF CORRECTION

PATENT NO. : 5,114,815
DATED : May 19, 1992
INVENTOR(S) : Yasuhiro Oda et al.

It is certified that error appears in the above-identified patent and that said Letters Patent is hereby corrected as shown below:

Claim 3, column 16, line 65, after "dispersion" insert --medium further--.

Signed and Sealed this

Twenty-sixth Day of October, 1993

Attest:

BRUCE LEHMAN

Attesting Officer     Commissioner of Patents and Trademarks